March 11, 1930.  W. GRANT ET AL  1,750,223
MEAT SAWING MACHINE
Filed July 5, 1928  2 Sheets-Sheet 2

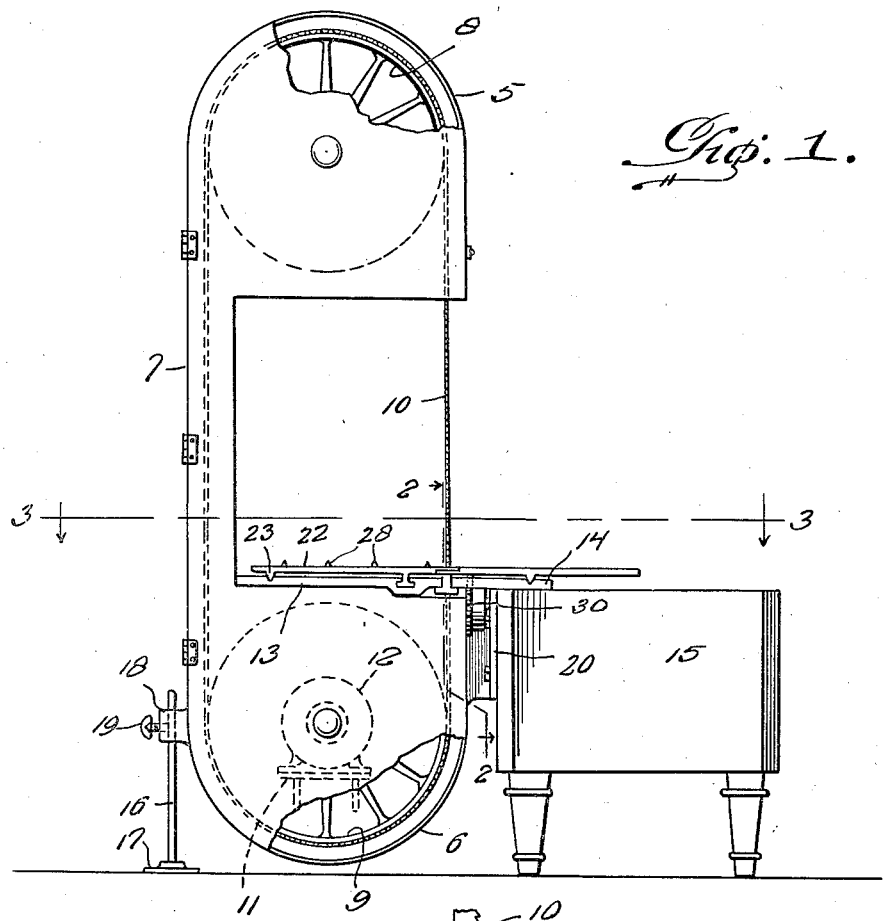

Inventors
Walton Grant,
G. W. Limebaugh,
By J Stanley Burch
Attorney

Patented Mar. 11, 1930

1,750,223

UNITED STATES PATENT OFFICE

WALTON GRANT AND GEORGE W. LIMEBAUGH, OF CIRCLEVILLE, OHIO

MEAT-SAWING MACHINE

Application filed July 5, 1928. Serial No. 290,657.

This invention relates to an improved meat sawing machine of that type employing a band saw passing over a pair of band wheels, and having a sliding table arranged between the band wheels so that as the table is slid in one direction the meat placed thereon is cut by the band saw.

The primary object of the present invention is to provide an improved meat sawing machine of the above kind adapted to be securely fastened to and mounted in operative relation to a meat bench or chopping block without requiring a special supporting base or stand, thereby economizing space, minimizing the weight of the machine, and facilitating the convenient use of the machine.

A further object is to provide an improved meat sawing machine having a frame which is extremely light in weight and so constructed as to completely encase the band wheels and the band saw except for the working stretch of the latter.

Still another object is to provide yieldable means for automatically returning the sliding table to a normal position from which it is propelled manually to feed the meat to the saw for being cut by the latter.

Other objects are to provide a band sawing machine of the above kind which is extremely simple and durable in construction, efficient in operation, economical to manufacture, and adapted for ready application to meat benches or chopping blocks of various heights.

The invention consists in the novel form, combination and arrangement of parts hereinafter more fully described, shown in the accompanying drawings and claimed.

In the drawings:

Figure 1 is a rear elevational view of a meat sawing machine embodying the present invention operatively associated with a chopping block, the frame of the machine being partly broken away and in section.

Figure 2 is an enlarged fragmentary vertical longitudinal section taken upon line 2—2 of Figure 1.

Figure 3:
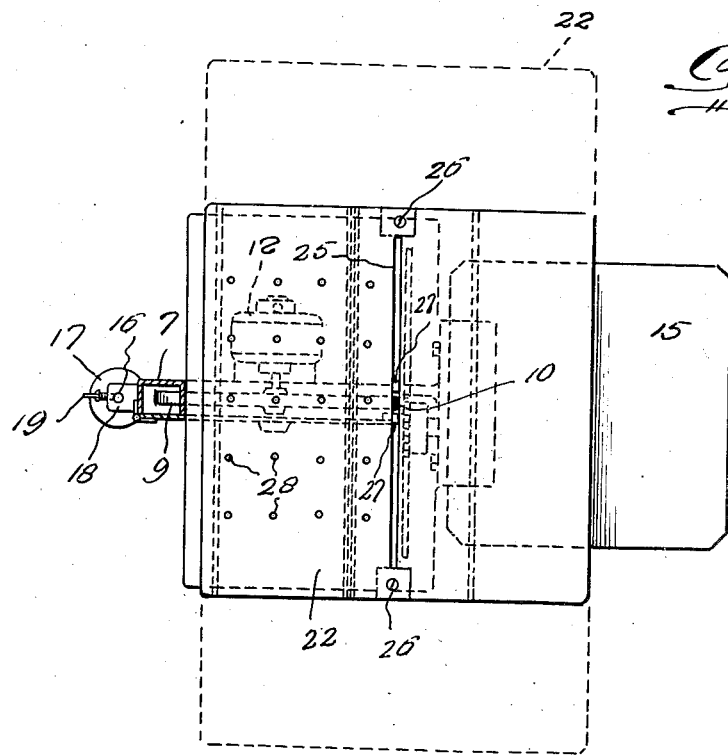
Figure 3 is a horizontal section on line 3—3 of Figure 1 with the sliding table positioned intermediate its limits of movement.
Figure 4:
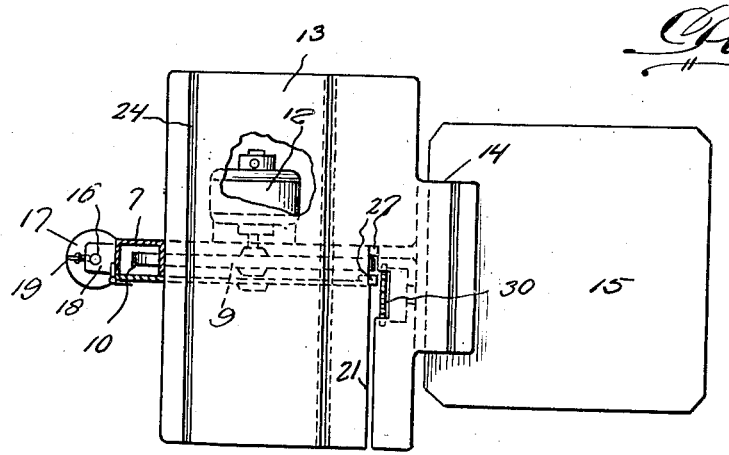
Figure 4 is a view similar to Figure 3 with the sliding table omitted.

Referring more in detail to the drawings, the present machine embodies a frame composed of upper and lower hollow heads 5 and 6 arranged in spaced superposed relation and rigidly and integrally connected at adjacent sides by means of a hollow upright 7. Suitably journaled in and completely encased by the heads 5 and 6 are band wheels 8 and 9 over which pass a band saw 10 having straight portions or vertical stretches between the drums, one of which is exposed and utilized for cutting purposes, and the other of which passes through and is completely enclosed or housed by the hollow upright 7. As shown, a small platform 11 may be provided on the front of the lower head 6 and on which is mounted an electric motor 12 which directly drives the shaft of the band wheel 9 to, in turn, drive the band saw 10. It is further noted that the rear wall of the frame constituted by the heads 5 and 6 and the upright 7, is separate from the remaining walls thereof and hinged or removably held in place to provide for convenient access to the band wheels 8 and 9 and access to or removal of the band saw 10.

Rigid with the top of the lower head 6 is a horizontal bed 13 disposed to project forwardly and rearwardly of the head 6 and to extend from the inner side of the upright 7 beyond the opposite side of the head 6 where it is formed with a central lateral extension 14 adapted to flatly rest upon the top of a chopping block or meat bench 15 to aid in firmly mounting the machine at the adjacent side of said bench or chopping block as will presently become apparent. The side of the frame adjacent the upright 7 is provided with an adjustable supporting leg adapted to engage the floor and to cooperate with the extension 14 of the bed 13 in supporting the machine at the required elevation, said supporting leg preferably including a post 16 having a floor-engaging foot 17 at its lower end and slidably projecting through an apertured lug 18 provided on the adjacent side of the lower head 6, the lug 18 having a set screw 19 adapted to impinge the post 16 for securing the supporting leg in the required position of vertical adjustment. Provided on the side of the lower head 6 opposite that at which the supporting leg is located, is an attaching bracket 20 disposed directly beneath the bed 13 and adapted to be securely fastened by screws or the like to the adjacent side of the bench or chopping block 15. It is thus apparent that the machine may be firmly mounted in operative relation to the bench or chopping block for convenient access or use in association with the latter and without the aid of heavy base castings or special supporting stands.

The bed 13 is provided with a slot 21 through which the band saw 10 passes, and this slot extends longitudinally of the bed 13 to and through the rear edge thereof for permitting insertion or removal of a band during assembly or repair when the removable or hinged rear wall of the frame is opened. A table 22 is mounted on the bed 13 for sliding movement longitudinally of the latter, and as shown, the table 22 has longitudinal ribs 23 on its under side slidably engaging in longitudinal guide grooves 24 provided in the upper surface of the bed 13 and its extension 14. However, it is obvious that the ribs 23 may be provided with anti-friction rollers adapted to run in the grooves 24 for facilitating the ease of movement of the table, if desired. The table 22 has a substantially central longitudinal elongated slot 25 through which the saw 10 passes, and the table is preferably composed of two sections detachably joined at the opposite ends of the slot and the table as at 26. In this way a rigid durable table is had whose sections may be separated to permit the ready insertion or removal of the saw, it being noted that the slot 25 extends substantially the entire length of the table so as to readily permit the necessary feeding movement of the table relative to the saw during the meat cutting operation.

It will be evident that meat placed on the table 22 will be cut by the saw 10 when the table and the meat are slid past the saw. The bed 13 is preferably provided with rigid upstanding lugs 27 disposed at opposite sides of the exposed portion of the saw and projecting within the slot 25 of the table, so as to limit the movement of the latter without danger of the table striking and damaging the saw. Further, the table 22 preferably has spurs 28 on the upper surface thereof adapted to penetrate the meat and prevent it from moving relative to the table when the latter is slid or propelled by pressing on the meat. As the table overhangs the extension 14 of the bed 13 and the top of the bench or chopping block 15, the meat may be readily transferred from the table to the bench or chopping block or vice versa with a minimum of effort and without danger of the meat falling on the floor. One of the grooves in the bed and one of the ribs on the table which cooperate therewith are preferably of interfitting form to hold the table down on the bed, as shown in Figure 1.

Suitable means is provided for yieldingly automatically returning the table 22 normally to its rearward limit of movement in position to start feeding of the table for cutting the meat. While this means may take one of many different forms or constructions, we have shown the table 22 as provided on its underside with a longitudinal rack 29 engaged by the peripheral teeth of a toothed spring drum 30 suitably mounted and journaled on the under side of the bed 13 at a point intermediate the sides of the table 22. It will of course be understood that the spring drum 30 is of a well known type commonly employed in connection with sash balances, typewriter carriage feed mechanisms and the like, the drum containing a coil spring attached at its inner end to the stationary spindle of the drum and at its outer end to the peripheral wall of the drum, whereby when the table is moved in one direction the drum is rotated for winding and placing the spring under tension, so that such tension will automatically return the table to its opposite limit of movement when pressure or feeding force thereon is romoved. As shown, the spring is to be tensioned as the table is fed forwardly by manual effort on the part of the butcher, thereby insuring ready automatic return of the table to its rearward limit of movement for the start of a new cutting operation as soon as the table is released. Naturally, the toothed periphery of the spring drum 30 is mounted adjacent an enlargement of the slot 21 so as to project upwardly through the latter for engagement with the rack 29 on the under side of the table.

It is noted that the spurs 28 are preferably provided upon the portion of the table 22 between the vertical stretches of the saw 10 where the meat to be cut is intended to be placed, thus resulting in the cut of meat falling toward the remaining outer side portion of the table and the adjacent chopping block or meat bench. It is obvious that various refinements or features may be embodied in the construction such as means for adjusting the tension of the saw and means for gaging the thickness of cut in the meat cutting operation, but these features have not been illustrated as they are generally well known in the art and form no specific part of the present invention, or improvement.

From the above description it will be seen that we have provided a very simple and durable form of meat cutting machine which is light in weight, capable of economical manufacture and ready mounting for use, and which provides for so encasing the moving parts as to minimize the liability of damage to the latter or injury to the user. Moreover, the construction is adapted for desirable cooperative relation with a bench or chopping block in such manner as to additionally eliminate the necessity for heavy and expensive special supporting bases or stands.

Minor changes may be made without departing from the spirit and scope of the invention as claimed.

What we claim as new is:

1. A meat sawing machine comprising a frame including a bed, said frame supporting a band saw and its associated mechanism, means to rigidly fasten one side of the frame adjacent its lower end to the side of a meat bench or the like with the bed substantially in the plane of the top of said bench, and floor-engaging supporting means at the opposite side of the lower end of said frame, said bed having an extension adapted to rest upon the top of said bench.

2. A meat cutting machine comprising an upright frame including a bed, said frame supporting a band saw and its associated mechanism, a sliding table on the bed, said bed and said table being arranged between the vertical reaches of the saw and projecting laterally beyond one of said reaches to overhang and rest upon the top of a meat bench or the like, means to rigidly fasten one side of the frame at its lower end to a side of said bench, and floor-engaging supporting means for the opposite side of said frame.

3. A meat cutting machine comprising an upright frame including a bed, said frame supporting a band saw and its associated mechanism, a sliding table mounted on the bed, said bed and said table extending between the vertical reaches of the saw and projecting laterally beyond one of said reaches to overhang and rest upon a meat bench or the like, and means to fasten said frame to one side of said meat bench or the like.

4. A meat cutting machine comprising a frame including a bed, said frame supporting a band saw and its associated mechanism, a sliding table on the frame and between the reaches of the saw and projecting laterally beyond one of said reaches, and yieldable means to normally slide said table to its limit of movement in one direction relative to the saw and the bed, said table having a longitudinal slot through which the saw extends, and stop lugs carried by the bed engageable with the ends of the table slot for limiting the sliding movement of the table in opposite directions, said lugs being disposed at opposite sides of the saw within said table slot.

5. A meat sawing machine comprising an upright frame including a bed, said frame supporting a band saw and its associated mechanism, means for rigidly securing one side of the frame near its lower end to a side of a meat bench or the like with the bed substantially in the same plane as the top of the bench, and a vertically adjustable floor-engaging supporting leg for the lower end of the frame at the opposite side of the latter.

In testimony whereof we affix our signatures.

GEORGE W. LIMEBAUGH.
WALTON GRANT.